US006645581B2

(12) United States Patent
Lawrence et al.

(10) Patent No.: US 6,645,581 B2
(45) **Date of Patent: *Nov. 11, 2003**

(54) INK JET RECORDING ELEMENT

(75) Inventors: Kristine B. Lawrence, Rochester, NY (US); Paul B. Merkel, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 09/999,374

(22) Filed: Oct. 31, 2001

(65) Prior Publication Data

US 2003/0152751 A1 Aug. 14, 2003

(51) Int. Cl.$^7$ .................................................. B32B 3/00
(52) U.S. Cl. .................................................... 428/32.24
(58) Field of Search ............................... 428/195, 32.24

(56) References Cited

U.S. PATENT DOCUMENTS 4,926,190 A 5/1990 Laver
5,073,448 A * 12/1991 Vieira et al. ................ 428/331
5,384,235 A 1/1995 Chen et al.
6,045,917 A 4/2000 Missell et al.

OTHER PUBLICATIONS

USSN 09/611,123 filed Jul. 6, 2000.

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet recording element having a support having thereon the following layers in order: a) a base layer of a polymeric binder, a polymeric mordant and a stabilizer having the following formula:

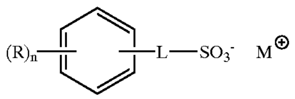

and b) an overcoat layer of a polymeric UV-absorbing material.

18 Claims, No Drawings

INK JET RECORDING ELEMENT

CROSS REFERENCE TO RELATED APPLICATIONS

Reference is made to commonly assigned, U.S. patent applications:

Ser. No. 09/998937 by Lawrence et al., filed of even date herewith entitled "Ink Jet Printing Method";

Ser. No. 09/999405 by Lawrence et al., filed of even date herewith entitled "Ink Jet Printing Method"; and Ser. No. 09/999469 by Lawrence et al., filed of even date herewith entitled "Ink Jet Recording Element".

FIELD OF THE INVENTION

This invention relates to an ink jet recording element which when printed with a water-soluble dye has improved Dmax density and light stability.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer that swells to absorb the ink or a porous layer that imbibes the ink via capillary action.

Ink jet prints, prepared by printing onto ink jet recording elements, are subject to environmental degradation. They are especially vulnerable to water smearing, dye bleeding, coalescence and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade or fade induced by atmospheric ozone.

U.S. Pat. No. 4,926,190 relates to the use of UV-absorbers in a recording material. However, there is a problem with these materials in that they are not polymeric and may tend to wander out of the layer.

U.S. Pat. No. 5,384,235 relates to the use of polymeric UV-absorbers in a silver halide color photographic element. However, there is no disclosure in this patent of the use of these materials in an inkjet recording system.

U.S. Pat. No. 6,045,917 relates to the use of cationic mordants in an ink jet image-recording layer. However, there is a problem with this element in that images formed in the image-receiving layer have poor light stability, as will be shown hereafter.

U.S. patent application Ser. No. 09/611,123, filed Jul. 6, 2000, relates to the use of stabilizers in an ink jet receiver for improved light stability. However, it would be desirable to improve the light stability of images formed in the image-receiving layer of this element.

This invention relates to an ink jet recording element which when printed with a water-soluble dye has improved Dmax density and light stability.

SUMMARY OF THE INVENTION

This and other objects are achieved in accordance with this invention which relates to an ink jet recording element comprising a support having thereon the following layers in order:

a) a base layer comprising a polymeric binder, a polymeric mordant and a stabilizer having the following formula:

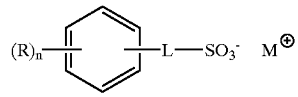

wherein:

each R individually represents a substituted or unsubstituted alkyl or alkoxy group having from about 1 to about 7 carbon atoms; a phenyl group having from about 6 to about 10 carbon atoms; a phenoxy group having from about 6 to about 10 carbon atoms; a carbonamido group having from about 1 to about 8 carbon atoms; or two or more R groups can be combined together to form a ring structure, n is 1 to 4;

L is a linking group containing at least one carbon atom; and $M^+$ is a monovalent cation, with the proviso that the total number of carbon atoms in all the R's and L taken together is at least 3, and at least one R is an alkoxy group; and b) an overcoat layer comprising a polymeric UV-absorbing material.

It has been found that the above recording element provides excellent Dmax density and light stability.

DETAILED DESCRIPTION OF THE INVENTION

Any water-soluble dye may be used in the ink jet ink composition employed in printing the element of the invention such as a dye having an avionic group, e.g., a sulfo group or a carboxylic group. The avionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the avionic, water-soluble dye which may be used in the composition employed in the method of the invention is a metallized azo dye, a non-metallized azo dye, a xanthene dye, a metallophthalocyanine dye or a sulfur dye. Mixtures of these dyes may also be used. Examples of dyes that may be used in the invention are as follows:

Dye 1

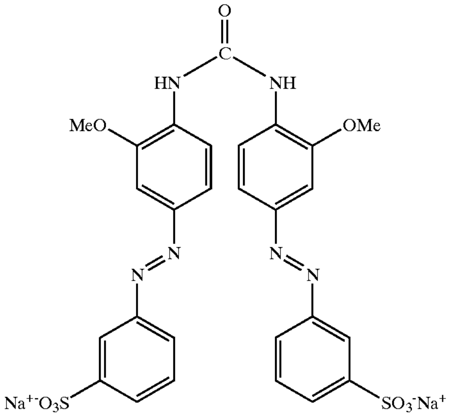

(Me is methyl)
Intrajet Yellow 132®
(Zeneca Specialties)

Dye 2

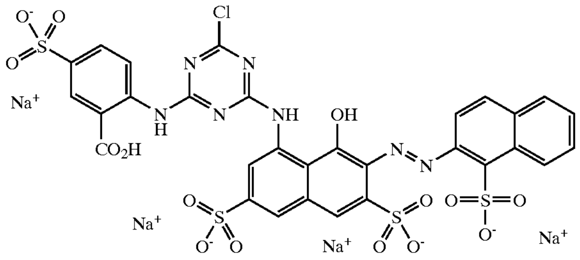

Reactive Red 31
(Lyson, Inc.)

-continued

Dye 3

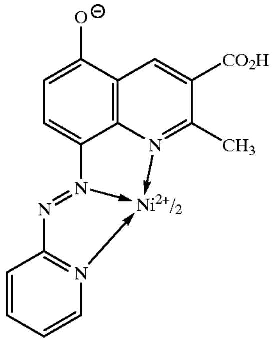

Dye 4

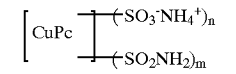

Direct Blue 199
(CuPc is copper phthalocyanine)
(Clariant Corp.)

The dyes described above may be employed in any amount effective for the intended purpose. In general, good results have been obtained when the dye is present in an amount of from about 0.2 to about 5% by weight of the ink jet ink composition, preferably from about 0.3 to about 3% by weight. Dye mixtures may also be used.

In a preferred embodiment of the invention, the polymeric UV-absorbing material comprises the following repeating units:

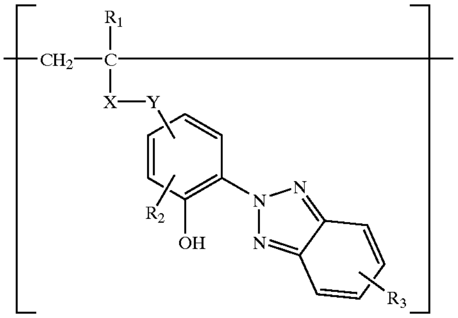

wherein:

$R_1$ represents H or $CH_3$;

$R_2$ represents H, halogen, alkoxy or a straight chain or branched alkyl group having from 1 to about 8 carbon atoms;

$R_3$ represents H, Cl, alkoxy or an alkyl group having from 1 to about 4 carbon atoms;

X represents COO, CONH or aryl; and

Y represents an alkylene group having from about 2 to about 10 carbon atoms or $(CH_2)_mO$ wherein m is 1 to about 4.

Specific examples of polymeric UV-absorbing repeating units useful in the invention include the following:

TABLE 1

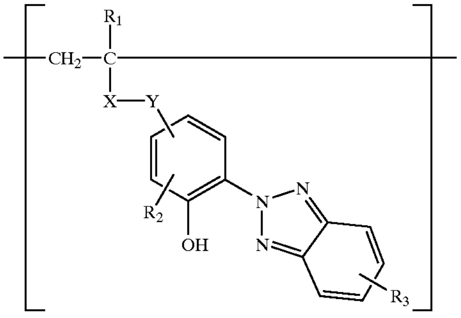

| UV-Absorber | $R_1$ | $R_2$ | $R_3$ | X | Y |
|---|---|---|---|---|---|
| UV-1 | $CH_3$ | H | H | COO | $(CH_2)_2$ |
| UV-2 | H | H | Cl | COO | $(CH_2)_3$ |
| UV-3 | H | H | H |  | $CH_2O$ |
| UV-4 | $CH_3$ | $C(CH_3)_3$ | H | COO | $(CH_2)_3$ |
| UV-5 | H | $CH_3$ | H | CONH | $CH_2$ |
| UV-6 | H | $CH_3$ | $OCH_3$ | CONH | $CH_2$ |
| UV-7 | H | $C(CH_3)_3$ | Cl | CONH | $CH_2$ |
| UV-8 | $CH_3$ | H | H | COO | $(CH_2)_2OCONH$ |
| UV-9 | $CH_3$ | Cl | H | COO | 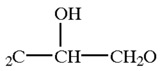 |
| UV-10 | $CH_3$ | H | Cl | COO | $(CH_2)_3$ |
| UV-11 | H | H | Cl | COO | $(CH_2)_3$ |
| UV-12 | $CH_3$ | H | Cl | COO | 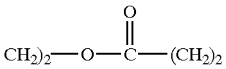 |
| UV-13 | H | H | Cl | COO | 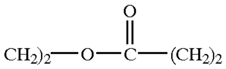 |
| UV-14 | $CH_3$ | H | Cl | COO | 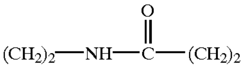 |
| UV-15 | H | $CH_3$ | H | 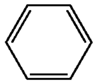 | $CH_2$ |
| UV-16 | H | $CH_3$ | Cl | COO | $(CH_2)_3$ |
| UV-17 | H | $CH_3$ | H | COO | $(CH_2)_2$ |
| UV-18 | $CH_3$ | H | Cl | COO | $(CH_2)_2O$ |
| UV-19 | H | H | Cl | COO | $(CH_2)_2$ |

The UV absorbing repeating units illustrated in Table 1 above can also be polymerized in the presence of two or more comonomers. For example, a combination of ethyl acrylate and acrylamido-2,2'-dimethyl propane sulfonic acid monomers can be copolymerized with UV absorbing repeating unit UV-1 above. Specific examples of polymeric UV absorbing materials useful for this invention are summarized below:

UVL-1: poly-(UV-1)-co-ethyl acrylate-co-2-sulfo-1,1-dimethylethylacrylamide, sodium salt (1:1:0.05 molar ratio)

UVL-2: poly-(UV-2)-co-ethyl acrylate-2-sulfo-1,1-dimethylethylacrylamide, sodium salt (1:1:0.05 molar ratio)

UVL-3: poly-(UV-3)-co-butyl acrylate-co-2-sulfo-1,1 dimethylethylacrylamide sodium salt (1:2:0.05 molar ratio)

The polymeric UV-absorbing materials employed in the invention can be used in an amount of from 0.05 to about 4.0 $g/m^2$, preferably from about 0.20 to about 1.5 $g/m^2$.

Any polymeric mordant can be used in the invention. In a preferred embodiment, the mordant can be a cationic protonated amine-containing polymer or a polymer that contains a quaternary ammonium group. Examples of these mordants include poly(1-vinylimidazole), poly(4-vinylpyridine), poly(styrene-co-N-benzyl-N,N-dimethyl-N-vinylbenzyl-ammonium chloride-co-divinylbenzene) (49:49:2 mole ratio), poly(N,N,N-tributyl-N-vinylbenzyl-ammonium chloride), poly(N,N-dimethyl-N-benzyl-N-vinylbenzyl-ammonium chloride), poly(styrene-co-N,N,N-trimethyl-N-vinylbenzyl-ammonium chloride) (1:1 mole ratio), poly(N,N,N-trimethyl-N-vinylbenzyl-ammonium chloride-co-divinylbenzene) (87:13 mole ratio), poly(N,N-dimethyl-N-octadecyl-N-vinylbenzyl-ammonium chloride), poly(styrene-co-1-vinylimidazole-co-3-hydroxyethyl-1-vinylimidazolium chloride) (5:4:1 mole ratio), poly(styrene-co-1-vinylimidazole-co-3-benzyl-1-vinylimidazolium chloride) (5:4:1 mole ratio), poly(styrene-co-1-vinylimidazole-co-3-hydroxyethyl-1-vinylimidazolium chloride) (2:2:1 mole ratio), poly(styrene-co-4-vinylpyridine-co-1-hydroxyethyl-4-vinylpyridinium chloride) (5:4:1 mole ratio), poly(diallydimethylammonium chloride) and chitosan.

The polymeric mordant employed in the invention can be used in an amount of from 0.2 to about 16 g/m$^2$, preferably from about 0.4 to about 8 g/m$^2$.

In a preferred embodiment of the invention, L in the above formula for the stabilizer contains at least one methylene group. In another preferred embodiment, the stabilizer contains at least two alkoxy groups. In still another preferred embodiment, the total number of carbon atoms in the R's and L taken together is a least 4. Following are examples of stabilizers, which can be used in the invention:

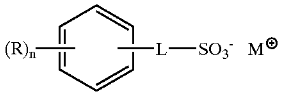

| Stabilizer | R | n | L | M |
|---|---|---|---|---|
| S-1 | 3,4-methylenedioxy | 2 (ring) | 1-(propyleneoxy-3-sulfonate) | Na |
| S-2 | 2-t-butyl 4-methoxy | 2 | 1-(propyleneoxy-3-sulfonate) | Na |
| S-3 | 2,5-dimethoxy | 2 | 1-(ethylene-2-(phenyl-4-sulfonate)) | Na |
| S-4 | 2,4,5-trimethoxy | 3 | 1-(ethylene-2-(phenyl-4-sulfonate)) | Na |
| S-5 | 2-t-butyl 4-methoxy | 2 | 1-(propyleneoxy-3-sulfonate) | K |
| S-6 | 3,4-methylenedioxy | 2 (ring) | 1-(propyleneoxy-3-sulfonate) | $NH_4$ |
| S-7 | 2,4,5-trimethoxy | 3 | 1-(ethylene-2-sulfonate) | K |
| S-8 | 2-methoxy 4-phenoxy | 2 | 1-(propyleneoxy-3-sulfonate) | Cs |
| S-9 | 2-methoxy 4-N-ethylacetamido | 2 | 1-(ethyleneoxy-2-(ethyleneoxy-2-sulfonate)) | K |
| S-10 | 2,5-dimethyl 4-ethoxy | 3 | 1-(butylene-4-sulfonate) | Na |
| S-11 | 4-t-butoxy | 1 | 1-(propyleneoxy-3-sulfonate) | Na |

Structures of stabilizers S-1 through S4 and S-9 are drawn below for clarity:

S-1

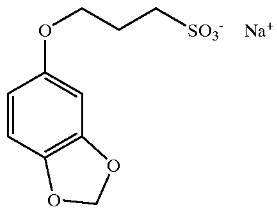

S-2

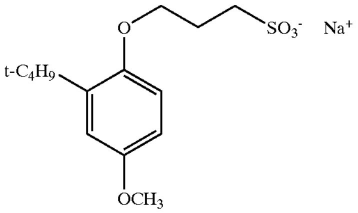

S-3

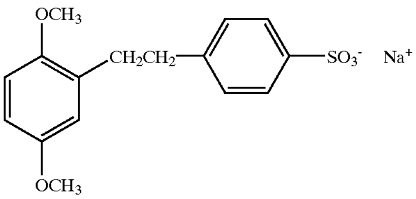

-continued

S-4

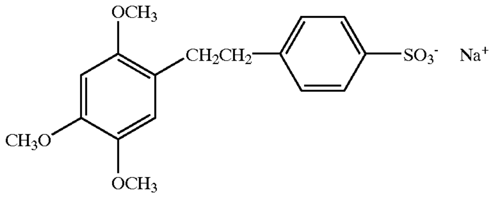

S-9

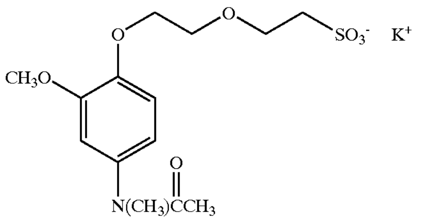

The benzene ring of the stabilizer may contain electron-donating substituents, such as alkyl and alkoxy groups, to enhance its efficiency as a quencher of excited states and as a stabilizer toward light-induced dye fading. One commonly-used measure of electron-donating character is provided by Hammett sigma values, which are published, for example, in "Exploring QSAR, Hydrophobic, Electronic and Steric Constants", C. Hansch, A. Leo and D. Hoekman, American Chemical Society, 1995. Electron-donating groups generally have negative Hammett sigma values. In a preferred embodiment of this invention, the sum of the Hammett sigma values of the R groups (referenced to the position of attachment of L) is less than −0.10

The stabilizer of this invention is coated in the ink jet recording element of this invention at a level of from about 0.04 to about 1.6 $g/m^2$, and preferably from about 0.08 to about 0.8 $g/m^2$.

The binder employed in the base layer is preferably a hydrophilic polymer. Examples of hydrophilic polymers useful in the invention include polyvinyl alcohol, polyvinyl pyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate/vinyl alcohol), poly(aciylic acid), poly(1-vinyl pyrrolidone), poly(sodium styrene sulfonate), poly(2-acrylamido-2-methane sulfonic acid), polyacrylamide or mixtures thereof In a preferred embodiment of the invention, the binder is gelatin or poly(vinyl alcohol).

The hydrophilic polymer may be present in an amount of from about 0.1 to about 30 $g/m^2$, preferably from about 0.2 to about 16 $g/m^2$ of the base layer.

The weight ratio of polymeric mordant to binder is from about 1:99 to about 8:2, preferably from about 1:9 to about 4:6.

Latex polymer particles and/or inorganic oxide particles may also be used in the binder in the base layer to increase the porosity of the layer and improve the dry time. Preferably, the latex polymer particles and/or inorganic oxide particles are cationic or neutral. Preferably, the latex polymer particles are porous. Examples of inorganic oxide particles include barium sulfate, calcium carbonate, clay, silica or alumina, or mixtures thereof In that case, the weight % of particulates in the image receiving layer is from about 70 to about 98%, preferably from about 80 to about 95%.

The pH of the aqueous ink compositions employed with the element of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali. metal hydroxides and carbonates. Typical organic bases include ammonia, triethanolamine and tetramethylethylenediamine.

A humectant is employed in the ink composition employed with the element of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether, nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed with the element of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane, and esters, such as, ethyl lactate, ethylene carbonate and propylene carbonate.

Surfactants may be added to adjust the surface tension of the ink to an appropriate level. The surfactants may be avionic, cationic, amphoteric or nonionic.

A biocide may be added to the composition employed with the element of the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt. %.

A typical ink composition employed with the element of the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives that may optionally be present in the ink jet ink composition employed with the element of the invention include thickeners, conductivity enhancing agents, anti-kogation agents, drying agents, and defoamers.

The ink jet inks employed with the elements of this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the element of the invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof, surfactants such as nonionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, antioxidants, optical brighteners, and the like. A hardener may also be added to the ink-receiving layer if desired.

The support for the ink jet recording element of the invention can be any of those usually used for inkjet receivers, such as paper, resin-coated paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxally oriented support laminates. Biaxally oriented support laminates are described in U.S. Pat. Nos. 5,853,965; 5,866,282, 5,874,205; 5,888,643; 5,888,681; 5,888,683; and U.S. Pat. No. 5,888,714, the disclosures of which are hereby incorporated by reference. These biaxally oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene, polysulfones; polyacrylates; polyetherimides; and mixtures thereof. The papers listed above include a broad range of papers, from high end papers, such as photographic paper to low end papers, such as newsprint.

The support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount that is effective for the intended purpose. In general, good results are obtained when it is present in an amount of from about 2 to about 60 g/m$^2$, preferably from about 6 to about 40 g/m$^2$, which corresponds to a dry thickness of about 2 to about 50 $\mu$m, preferably about 6 to about 40 $\mu$m.

The overcoat layer may be present in any amount that is effective for the intended purpose. In general, good results are obtained when it is present in an amount of from about 1.1 to about 10.7 g/m$^2$, preferably from about 1.6 to about 5.4 g/m$^2$, which corresponds to a dry thickness of about 1.0 to about 10 $\mu$m, preferably about 1.5 to about 5 $\mu$m.

The following examples illustrates the utility of the present invention.

EXAMPLES

The following polymers were used as mordants in the image-recording layer:

MP-1: poly(N-vinylbenzyl-N,N,N-trimethylammonium chloride-co-divinylbenzene) (about 90/10 mol %) (U.S. Pat. No. 6,045,917)

MP-2: poly(styrene-co-N-vinylbenzyl-N,N,N-trimethylammonium chloride-co-divinylbenzene) (about 49/49/2 mol %) (U.S. Pat. No. 6,045,917)

Synthesis of UVL-1

260 g of deionized water, 2.26 g of 20% sodium N-methyl-N-oleoyltaurate (surfactant Igepon T-77®), and 26 g of acetone were mixed in a 500 mL, 4-necked round bottom flask equipped with a mechanical stirrer, nitrogen inlet, and condenser. The flask was immersed in a constant temperature bath at 80° C. and heated for 30 minutes with nitrogen purging through. The monomer solution was composed of 6.46 g of 2-(2'-hydroxy-5-methacrylyloxyethylphenyl)-2H-benzotriazole (0.02 mole), 2.00 g of ethylacrylate (0.02 mole), 0.23 g of 2-sulfo-1,1-dimethylethylacrylamide, sodium salt (0.001 mole) and 130 mL of N,N-dimethylformamide. The co-feed solution was made of 0.9 g of Igepon T-77® (20%), 1.8 g of sodium persulfate, and 20 g of deionized water. 3.91 g of 5% potassium persulfate was added to the reactor and stirred for 3 minutes. The monomer and co-feed solution were pumped into the reactor over 4 hours. The polymerization was continued for 8 hours. The latex was cooled, filtered and dialyzed against distilled water overnight. The latex was then concentrated down by an Amicon Ultrafiltration unit to the desirable concentration.

Synthesis of UVL-3

UVL-3 was prepared by the identical method, except a mixture of 6.86 g of 2-(2-hydroxy-4-m&p-vinylbenzyloxyphenyl)benzotriazole (60:40) (0.02 mole), 5.12 g of butyl acrylate (0.04 mole), 0.23 g of 2-sulfo-1,1 dimethylethyl acrylamide sodium salt (0.001 mole) and 130 mL of N,N-dimethylformamide were used as the monomer solution.

Example 1

Light Stability in Gelatin Based Coatings

Preparation of a water soluble, avionic dye ink composition, I-1

Ink I-1 containing Dye 1 identified above was prepared by mixing the dye concentrate (3.1%) with de-ionized water containing humectants of diethylene glycol (Aldrich Chemical Co.) and glycerol (Acros Co.), each at 6%, a biocide, Proxel GXL® biocide (Zeneca Specialties) at 0.003 wt %, and a surfactant, Surfynol 465® (Air Products Co.) at 0.05 wt. %.

The dye concentration was based on solution absorption spectra and chosen such that the final ink when diluted 1:1000, would yield a transmission optical density of approximately 1.0.

Preparation of a Water Soluble, Avionic Dye Ink Composition, I-2

Ink I-2 containing Dye 2 identified above (Reactive Red 31, CAS-12237-00-2) was composed of Novajet® Magenta Ink (Lyson Inc.) prepared by mixing 100 g of the commercial ink with 0.5 g of Surfynol 465® surfactant (Air Products Inc.).

Preparation of Control Ink Recording Element C-1

The composite side of a polyethylene resin-coated photographic grade paper based support was corona discharge treated prior to coating. Control Ink Recording Element was composed of a mixture of 0.86 $g/m^2$ of mordant polymer MP-2, 7.75 $g/m^2$ of gelatin and 0.09 $g/m^2$ of S-100 12 $\mu$m polystyrene beads (ACE Chemical Co.), and coated from distilled water on the above mentioned paper support.

Preparation of Invention Ink Recording Elements E-1 Through E-2

Recording elements E-1 through E-2 of the invention were composed of two layers. The base layer was composed of a mixture of 0.86 $g/m^2$ of mordant polymer MP-2, 7.43 $g/m^2$ of gelatin, 0.09 $g/m^2$ of S-100 12 $\mu$m polystyrene beads (ACE Chemical Co.), and 0.33 $g/m^2$ of S-1 (E-1) or S-2 (E-2) coated from distilled water.

These base layers were then overcoated with a mixture of 0.61 $g/m^2$ of UVL-1, 1.51 $g/m^2$ of gelatin and 0.02 $g/m^2$ of Olin 10G® surfactant from distilled water.

Preparation of Invention Ink Recording Elements E-3 Through E-4

Recording elements E-3 through E-4 of the invention were prepared analogous to E-1 and E-2 above except the overcoat layer was composed of a mixture of 0.67 $g/m^2$ of UVL-2 and 1.51 $g/m^2$ of gelatin.

Printing

Elements E-1 through E-4 and control element C-1 were printed using an Epson 200® printer using I-1 and I-2 inks described above. After printing, all images were allowed to dry at room temperature overnight, and the densities were measured at all steps using an X-Rite 820® densitometer. The Dmax densities at step 11 were recorded for I-1 and I-2 in Table 2 below.

The images were then subjected to a high intensity daylight fading test for 2 weeks, 50 Klux, 5400° K., approximately 25% RH. The Status A blue or green reflection density nearest to 1.0 was compared before and after fade and a percent density retained was calculated for the yellow (I-1) and magenta (I-2) inks with each receiver element. The results can be found in Table 2 below.

TABLE 2

| Recording Element | Dmax Density, I-1 | % Retained After Fade, I-1 | Dmax Density, I-2 | % Retained After Fade, I-2 |
|---|---|---|---|---|
| E-1 | 1.55 | 86 | 1.96 | 88 |
| E-2 | 1.59 | 93 | 2.01 | 88 |
| E-3 | 1.62 | 86 | 1.95 | 88 |
| E-4 | 1.54 | 88 | 1.86 | 89 |
| C-1 | 1.40 | 63 | 1.83 | 60 |

The above results show that the recording elements E-1 through E-4 of the invention, as compared to the control recording element C-1 gave higher Dmax densities and % retained densities after high intensity daylight fading.

Example 2

Light Stability of Coatings Containing Stabilizer and UV Overcoat Vs Just Stabilizer Or Just UV Overcoat Preparation of Control Ink Recording Elements C-2 Through C-3

Control ink recording elements C-2 through C-3 were composed of a mixture of 0.86 $g/m^2$ of mordant polymer MP-2, 7.43 $g/m^2$ of gelatin, 0.09 $g/m^2$ of S-100 12 $\mu$m polystyrene beads (ACE Chemical Co.), and 0.33 $g/m^2$ of S-1 (E-1) or S-2 (E-2) coated from distilled water.

Preparation of Control Recording Element C-4

Control ink recording element C-4 was prepared by overcoating C-1 prepared above with a mixture of 0.61 $g/m^2$ of UVL-1, 1.51 $g/m^2$ of gelatin and 0.02 $g/m^2$ of Olin 10G® surfactant from distilled water.

Preparation of Control Recording Element C-5

Control ink recording element C-5 was prepared analogous to C-4 except 0.67 $g/m^2$ of UVL-2 was used in place of UVL-1.

Printing

Elements E-1 through E-4 and control elements C-1 through C-5 were printed as described in Example 1 using I-1 and I-2 and the results can be found in Table 3 below.

TABLE 3

| Recording Element | Dmax Density, I-1 | % Retained After Fade, I-1 | Dmax Density, I-2 | % Retained After Fade, I-2 |
|---|---|---|---|---|
| E-1 | 1.55 | 86 | 1.96 | 88 |
| E-2 | 1.59 | 93 | 2.01 | 88 |
| E-3 | 1.62 | 86 | 1.95 | 88 |
| E-4 | 1.54 | 88 | 1.86 | 89 |
| C-1 | 1.40 | 63 | 1.83 | 60 |
| C-2 | 1.47 | 79 | NA | NA |
| C-3 | 1.45 | 87 | 1.93 | 75 |
| C-4 | 1.54 | 85 | 1.88 | 86 |
| C-5 | 1.53 | 84 | 1.95 | 85 |

The above results show that the recording elements E-1 through E-4 of the invention, as compared to the control recording elements C-1 through C-5 gave higher Dmax densities and % retained densities after high intensity daylight fading. This demonstrates that using a combination of stabilizer and UV-overcoat gives superior performance over using either of these materials individually.

Example 3

Light Stability in PVA Coatings Preparation of Control Recording Elements C-6 Through C-7

Control ink recording elements C-6 through C-7 were composed of a mixture of 1.19 $g/m^2$ of mordant polymer MU-2, and 9.13 $g/m^2$ of either GH-17 (C-6, Gohsenol®, 86.5–89.0% hydrolyzed, 27–33 cps) or KH-17 (C-7, Gohsenol, 78.5–81.5% hydrolyzed, 32–38 cps) poly(vinyl alcohol) respectively, (Nippon Gohsei), 0.43 $g/m^2$ of S-2 and 0.05 $g/m^2$ of Olin 10G® surfactant coated from distilled water.

Preparation of Invention Ink Recording Elements E-5 Through E-6

Recording elements E-5 through E-6 of the invention were prepared analogous to E-2 above except C-6 and C-7 were overcoated using a mixture of UVL-1 and GH-17 (E-5) or KH-17 (E-6) in place of gelatin.

Printing

Elements E-5 through E-6 and control elements C-6 through C-7 were printed as described in Example 1 using I-2 and the results can be found in Table 4 below.

TABLE 4

| Recording Element | Dmax Density | % Retained after Fade |
|---|---|---|
| E-5 | 2.22 | 93 |
| E-6 | 2.20 | 93 |
| C-6 | 2.01 | 72 |
| C-7 | 2.00 | 76 |

The above results show that the recording elements E-5 through E-6 of the invention, as compared to the control recording elements C-6 and C-7, gave higher densities and % retained after high intensity daylight fading.

Example 4

Preparation of a Water Soluble, Avionic Dye Ink Set, I-3 Through I-5

The Yellow ink jet ink I-3 was prepared using a standard formulation with Direct Yellow 132 (Dye 1 above, Projet Yellow 1G®, Zeneca Specialties, 10% solution in water) as the dye. The magenta ink I-4 was prepared using a standard formulation for Dye 3 above (see Dye 6 from U.S. Pat. No. 6,001,161 for specifics). The cyan ink jet ink I-5 was prepared using a standard formulation with Direct Blue 199 (see Dye 4 above, Duasyn Turquoise Blue FRL-S® from Clariant Corp., 10% solution in water) as the dyes.

The standard formulations used for these inks include: 2-pyrrolidinone (3%); tri(ethylene glycol) (5%); glycerin (4%); Dowanol DB® (2.5%) and Surfynol 465® (0.5%). For I-4, triethanolamine (0.25%) was also added. The dye concentrations for each ink were based on solution absorption spectra and chosen such that the final ink, when diluted 1:1000, would yield a transmission optical density of approximately 1.0. The percentages for each dye used are summarized in Table 5 Below.

TABLE 5

| Ink | Dye | % of Dye |
|---|---|---|
| I-3 | Dye 1 | 45 |
| I-4 | Dye 3 | 1.1 |
| I-5 | Dye 4 | 40 |

Printing

Elements E-5 through E-6 and control elements C-6 through C-7 from Example 3 were printed using a Lexmark Z51® ink jet printer with inks I-3 through I-5 described above. After printing, all images were allowed to dry at room temperature overnight, and the densities were measured at all steps using an X-Rite 820® densitometer. The images were then subjected to a high intensity daylight fading test for 2 weeks, 50 Klux, 5400° K., approximately 25% RH. The Status A reflection densities for the single colors (yellow, magenta and cyan) and the 2 (red, green, and blue) and 3 (neutral) color combinations at 50% coverage were compared before and after fade and a percent dye retained for each was recorded. The results can be found in Tables 6 through 8 below.

TABLE 6

| Recording Element | Results for Single Colors<br>% Retained I-3 | % Retained I-4 | % Retained I-5 |
|---|---|---|---|
| E-5 | 93 | 96 | 98 |
| E-6 | 93 | 98 | 100 |
| C-6 | 83 | 85 | 98 |
| C-7 | 81 | 82 | 100 |

TABLE 7

| Receiver | Results for Red, Green and Blue Combinations<br>% Retained, Red | | % Retained, Green | | % Retained, Blue | |
|---|---|---|---|---|---|---|
| Element | G/R | B/R | R/G | B/G | R/B | G/B |
| E-5 | 95 | 94 | 98 | 96 | 100 | 96 |
| E-6 | 95 | 95 | 97 | 98 | 99 | 96 |
| C-6 | 91 | 86 | 95 | 92 | 96 | 90 |
| C-7 | 89 | 84 | 96 | 91 | 95 | 89 |

TABLE 8

| Receiver | Results for Neutral<br>% Retained, Neutral | | |
|---|---|---|---|
| Element | R/N | G/N | B/N |
| E-5 | 99 | 96 | 95 |
| E-6 | 98 | 96 | 95 |
| C-6 | 92 | 93 | 92 |
| C-7 | 96 | 95 | 95 |

The above results show that the recording elements E-5 through E-6 of the invention, as compared to the control recording elements C-6 and C-7, gave higher % retained density after high intensity daylight fading for all color combinations.

The invention has been described in detail with particular reference to certain preferred embodiments thereof, but it will be understood that variations and modifications can be effected within the spirit and scope of the invention.

What is claimed is:

1. An ink jet recording element comprising a support having thereon the following layers in order:

a) a base layer comprising a polymeric binder, a polymeric mordant and a stabilizer having the following formula:

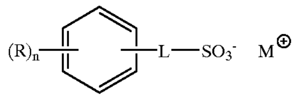

wherein:

each R individually represents a substituted or unsubstituted alkyl or alkoxy group having from about 1 to about 7 carbon atoms, a phenyl group having from about 6 to about 10 carbon atoms; a phenoxy group having from about 6 to about 10 carbon atoms; a carbonamido group having from about 1 to about 8 carbon atoms; or two or more R groups can be combined together to form a ring structure;

n is 1 to 4;

L is a linking group containing at least one carbon atom; and $M^+$ is a monovalent cation;

with the proviso that the total number of carbon atoms in all the R's and L taken together is at least 3, and at least one R is an alkoxy group; and b) an overcoat layer comprising a polymeric UV-absorbing material.

2. The element of claim 1 wherein said polymeric UV-absorbing material comprises the following repeating units:

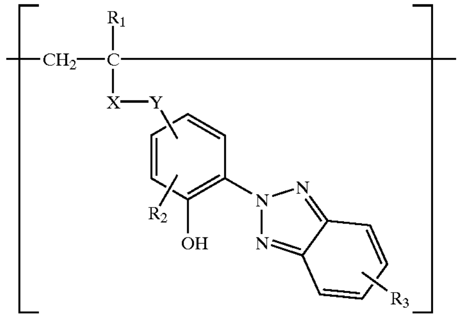

wherein:

$R_1$ prepresents H or $CH_3$;

$R_2$ represents H, halogen, akoxy or a straight chain or branched alkyl group having from 1 to about 8 carbon atoms;

$R_3$ represents H, Cl, alkoxy or an alkyl group having from 1 to about 4 carbon atoms;

X represents COO, CONH or aryl; and

Y represents an alkylene group having from about 2 to about 10 carbon atoms or $(CH_2)_mO$ wherein m is 1 to about 4.

3. The element of claim 2 wherein:

$R_1$ represents $CH_3$;

$R_2$ represents H;

$R_3$ represents H;

X represents COO; and

Y represents $CH_2CH_2$.

4. The element of claim 2 wherein:

$R_1$ represents H;

$R_2$ represents H;

$R_3$ represents Cl;

X represents COO; and

Y represents $CH_2CH_2CH_2$.

5. The element of claim 1 wherein said polymeric binder is hydrophilic.

6. The element of claim 5 wherein said hydrophilic polymer is poly(vinyl alcohol) or gelatin.

7. The element of claim 1 wherein said polymeric UV-absorbing material is present in an amount from about 0.05 to about 4.0 g/m$^2$.

8. The element of claim 1 wherein said polymeric mordant is cationic and is present in an amount from about 0.2 to about 16 g/m$^2$.

9. The element of claim 1 wherein said overcoat layer contains a hydrophilic polymeric binder.

10. The element of claim 1 wherein said polymeric binder contains particulates.

11. The element of claim 10 wherein said particulates are present in said base layer in an amount of from about 70 to about 98% by weight.

12. The element of claim 10 wherein said particulates are inorganic oxides or organic latex polymers.

13. The element of claim 1 wherein said overcoat layer contains particulates.

14. The element of claim 13 wherein said particulates are inorganic oxides or organic latex polymers.

15. The recording element of claim 1 wherein said stabilizer contains at least two alkoxy groups.

16. The recording element of claim 1 wherein said M is Na, K or $NH_4$.

17. The recording element of claim 1 wherein the stabilizer is present at an amount of from about 0.04 to about 1.6 g/m$^2$.

18. The recording element of claim 1 wherein said stabilizer is

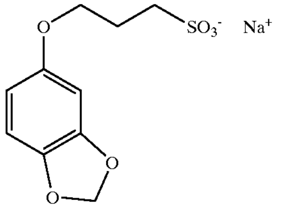

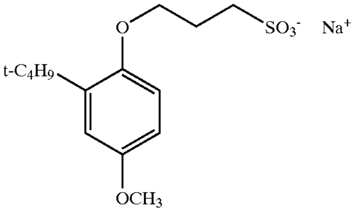

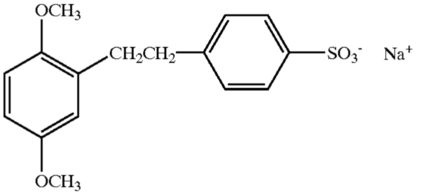

or

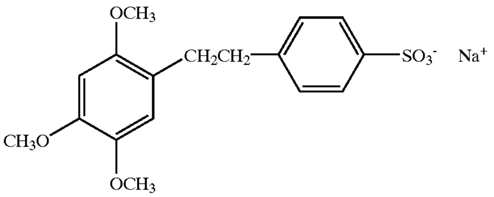

* * * * *